UNITED STATES PATENT OFFICE.

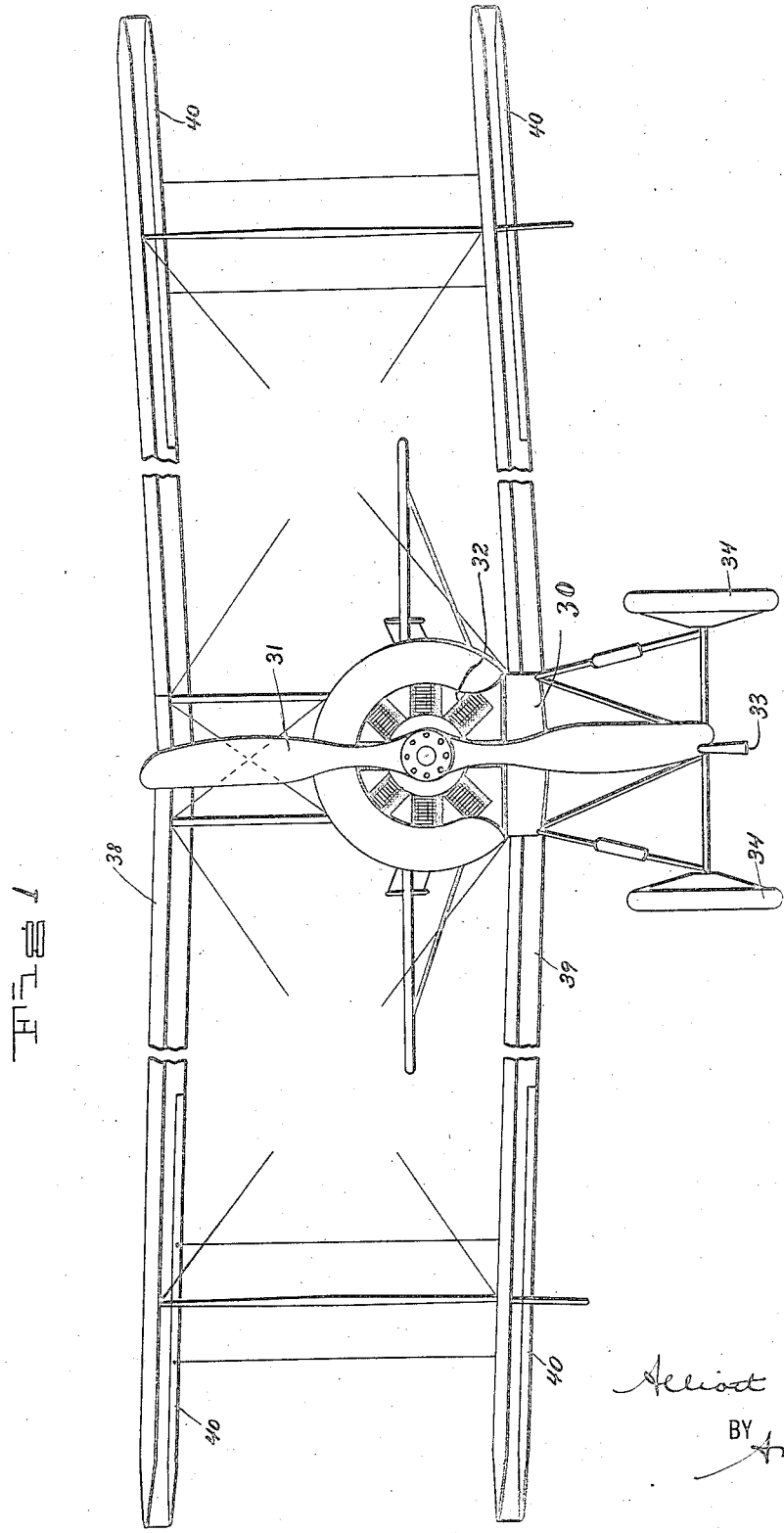

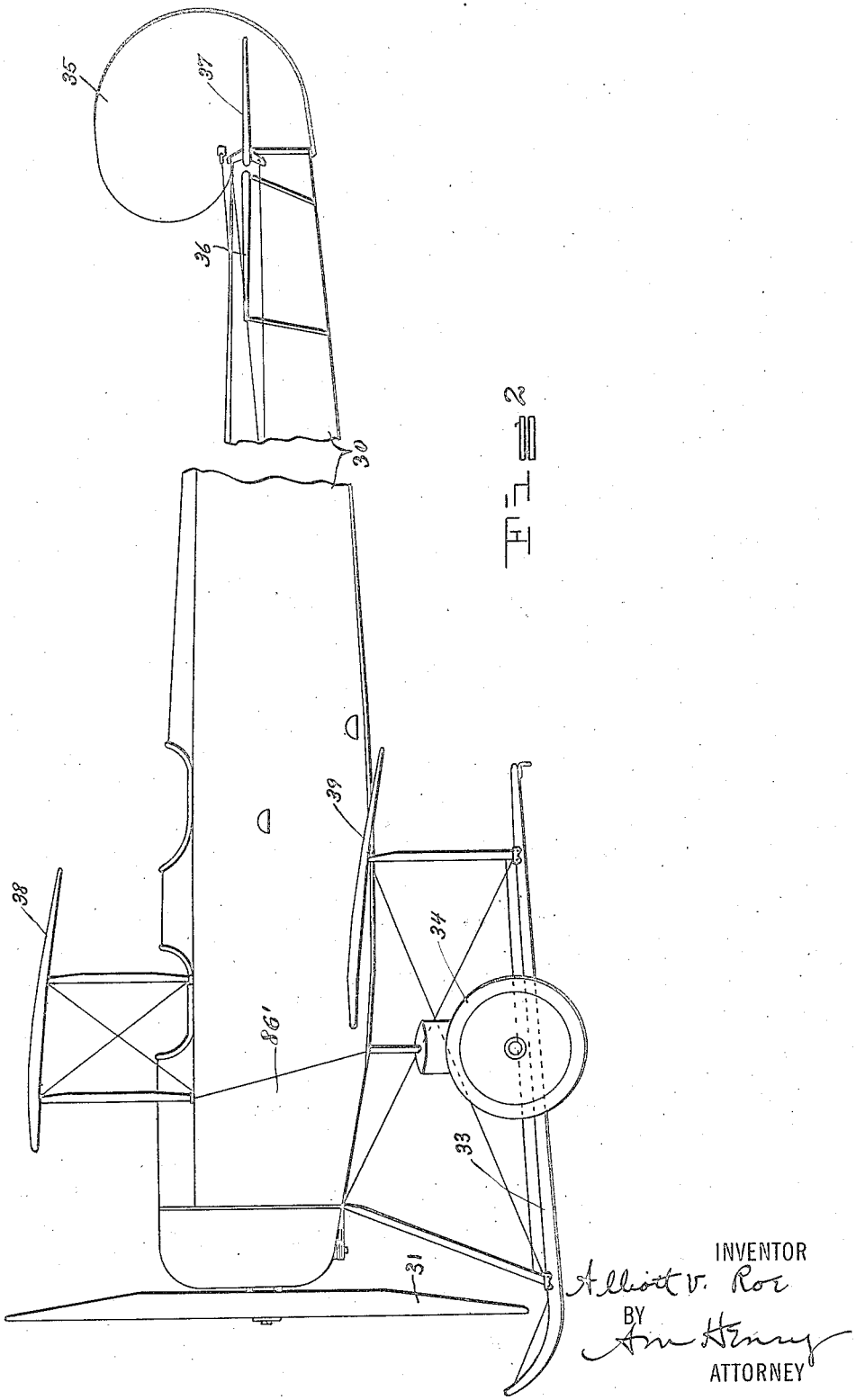

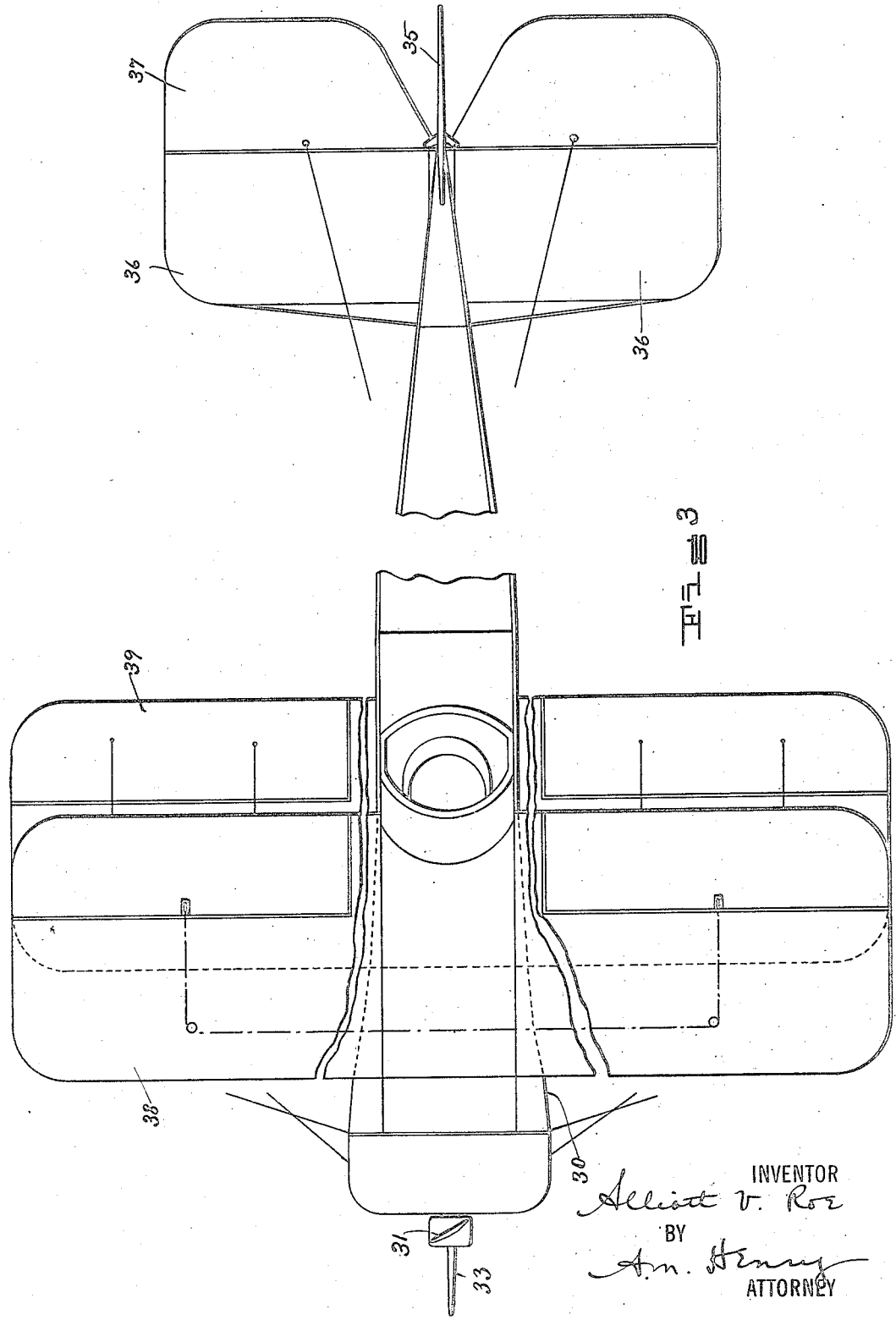

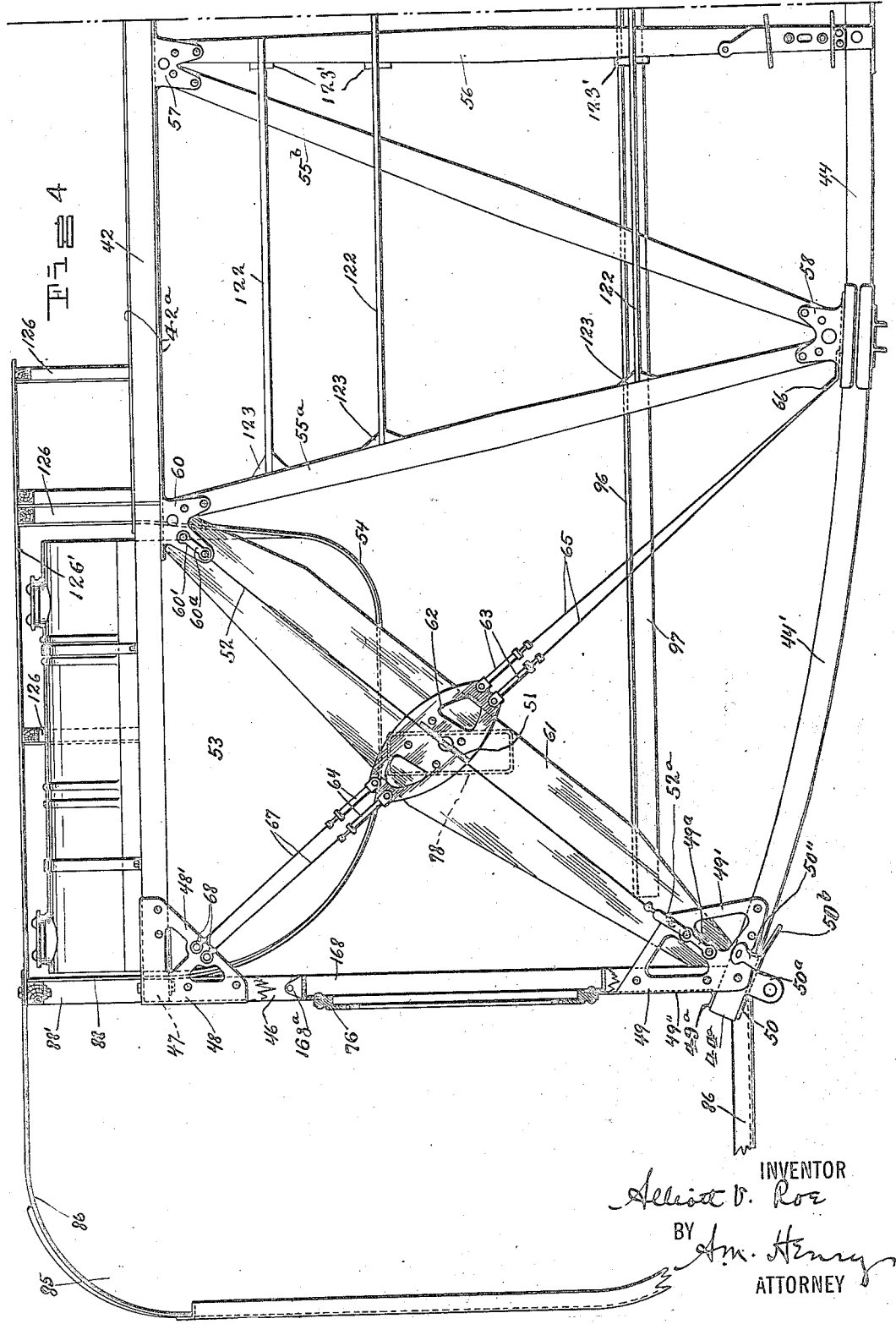

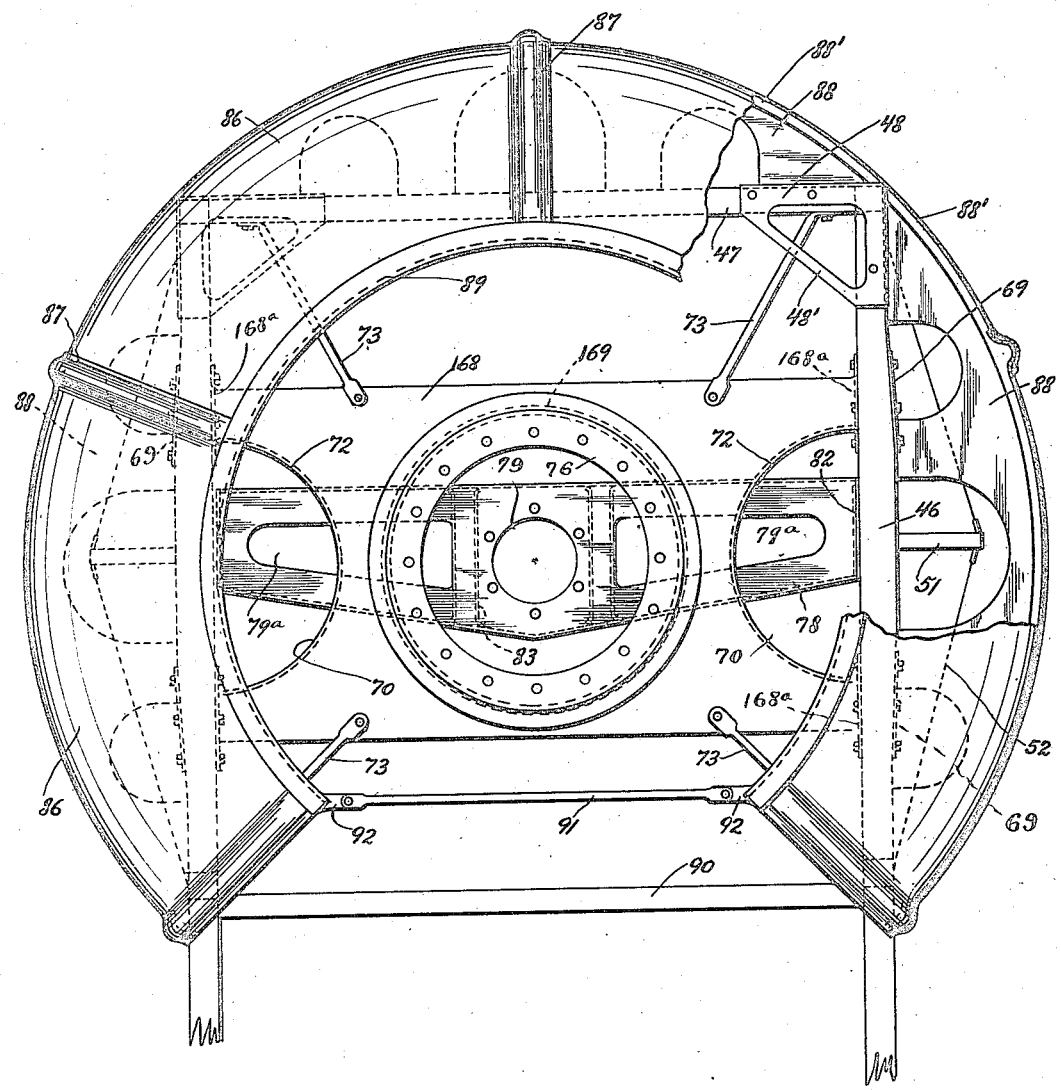

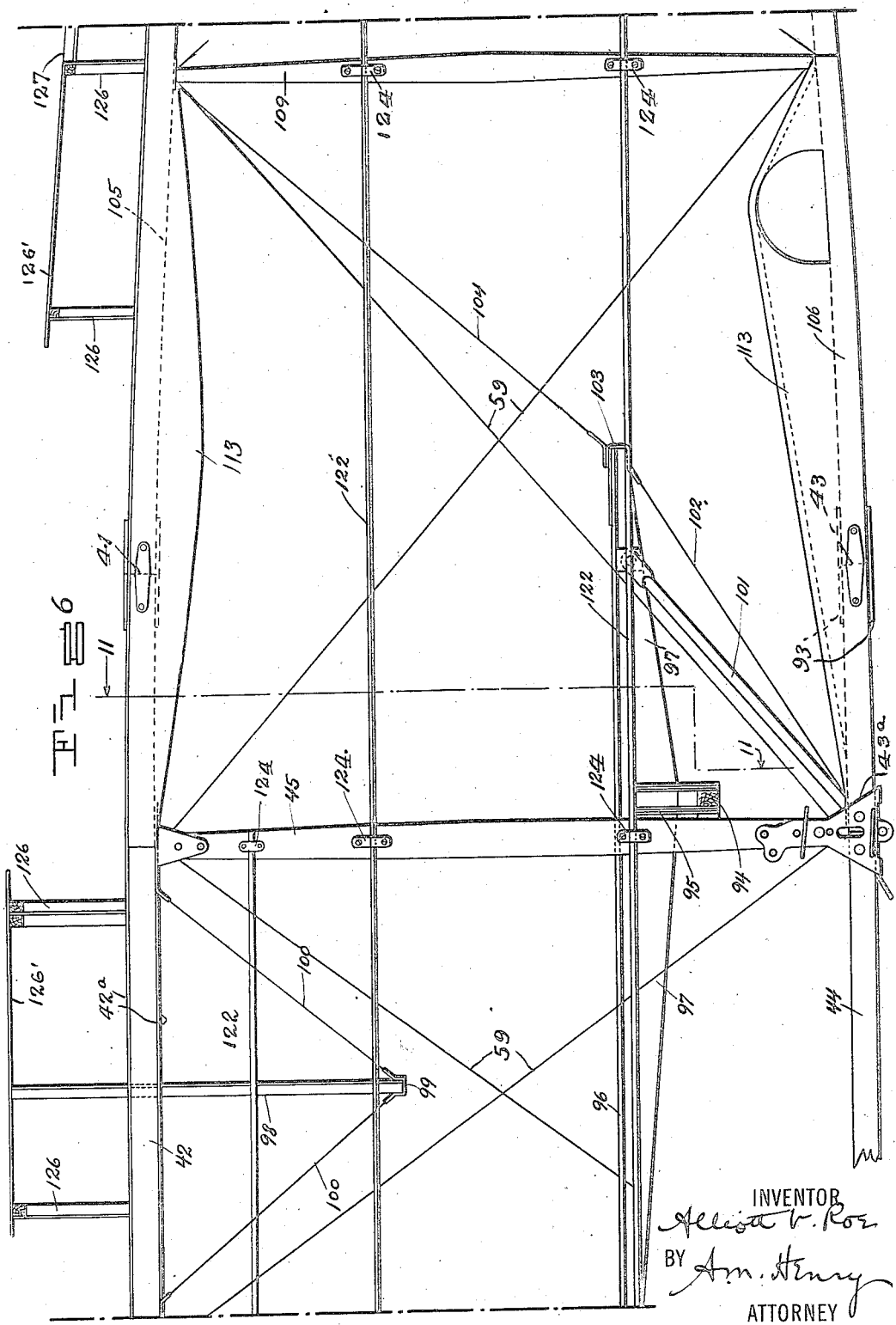

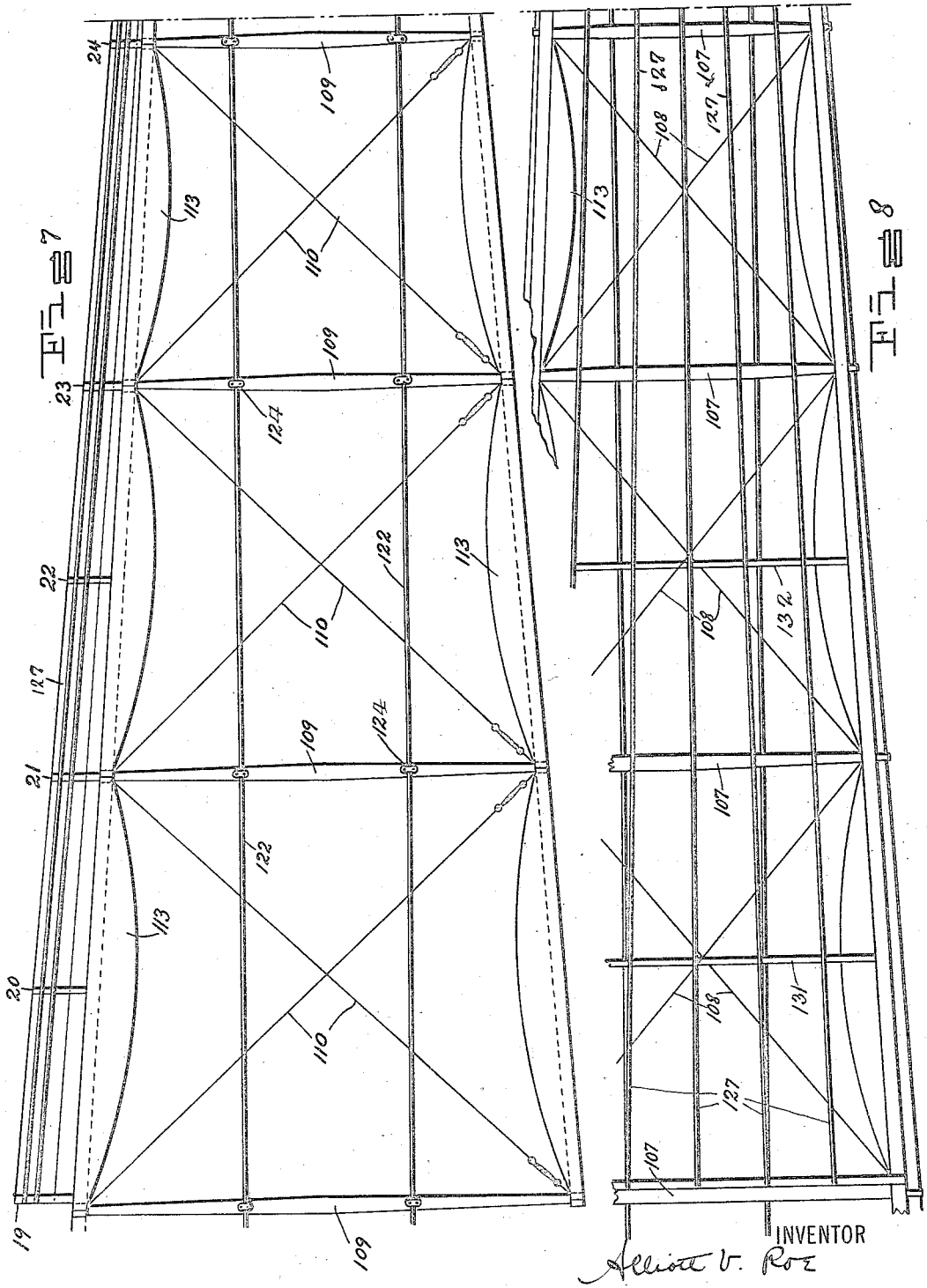

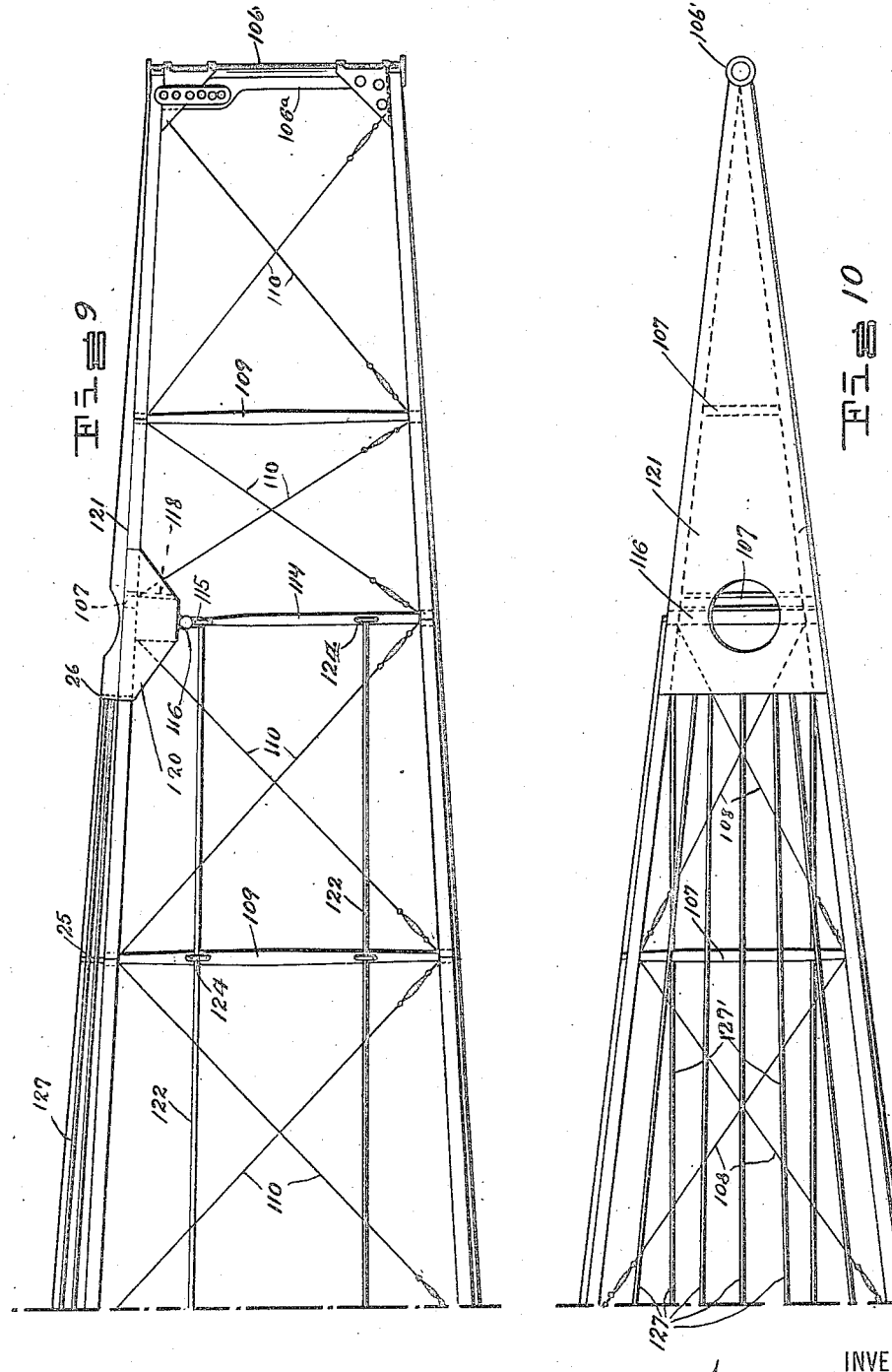

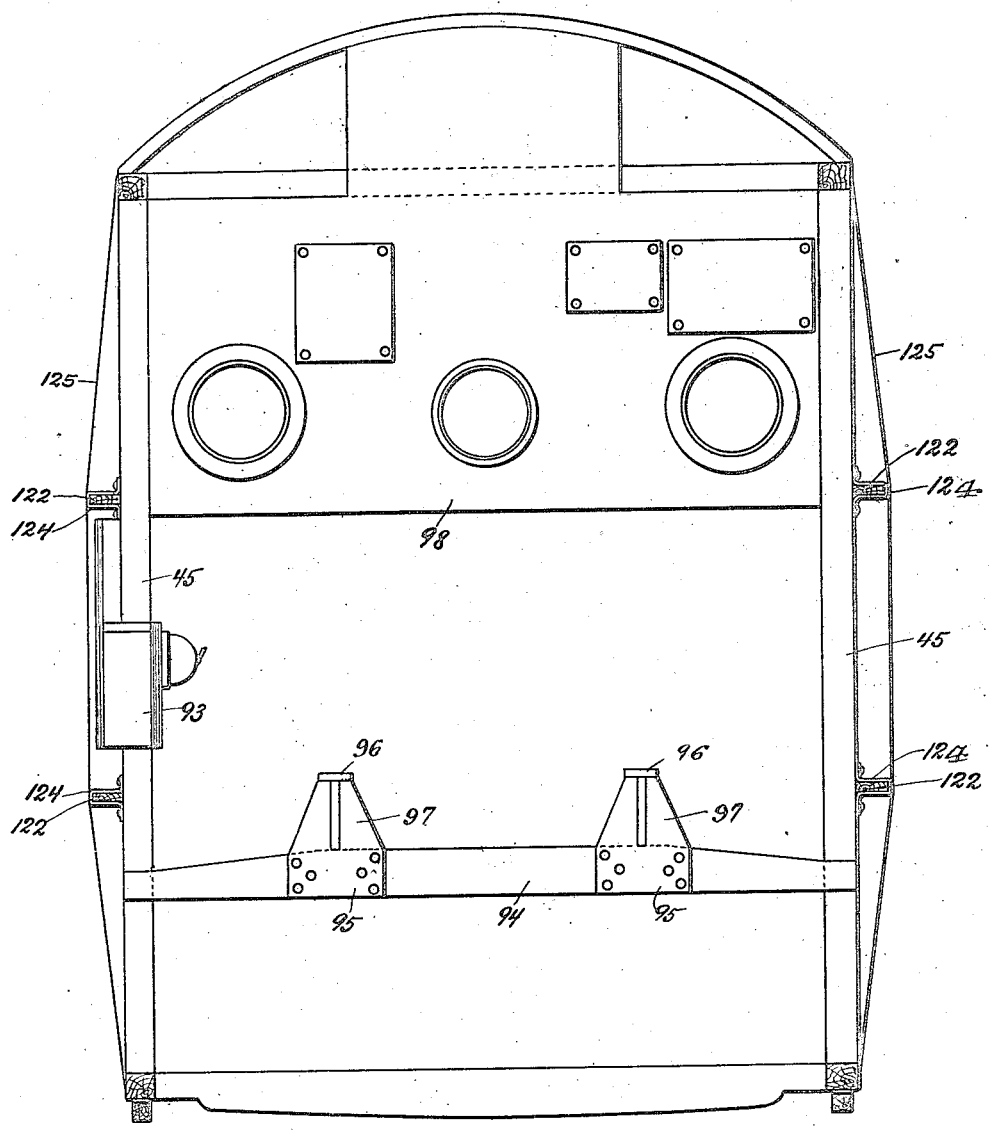

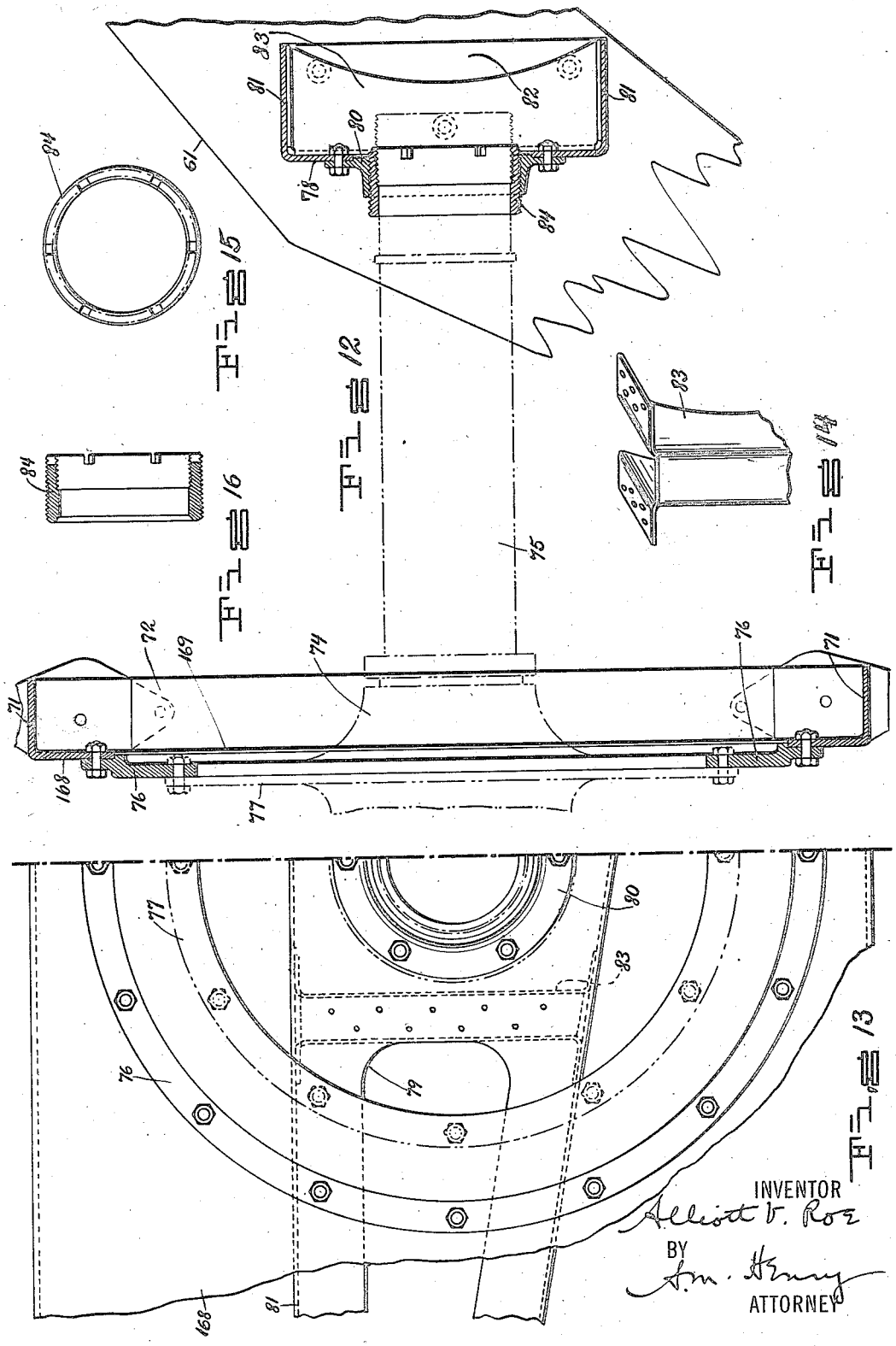

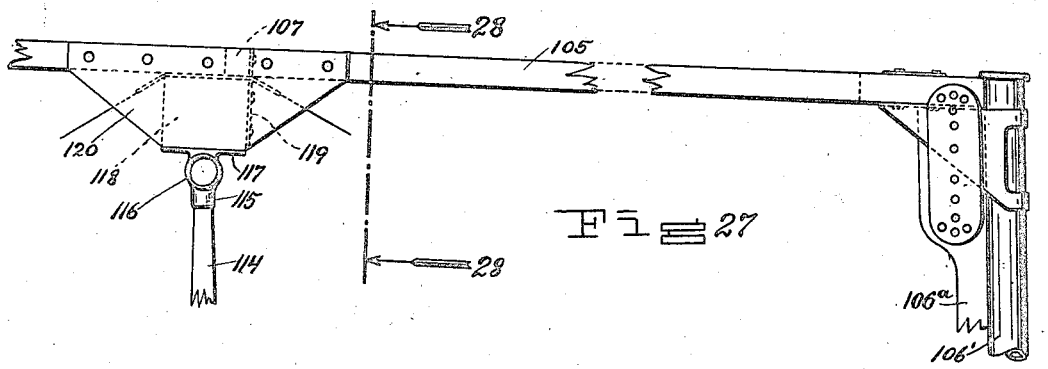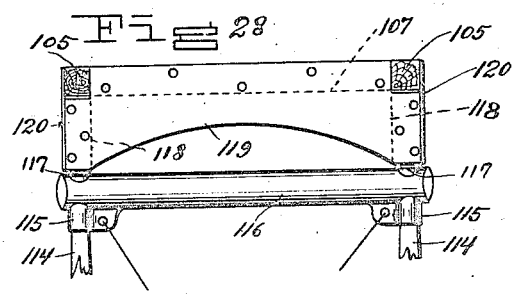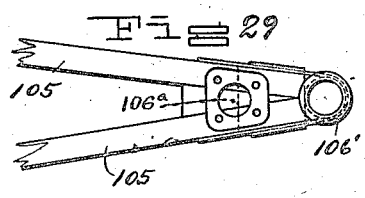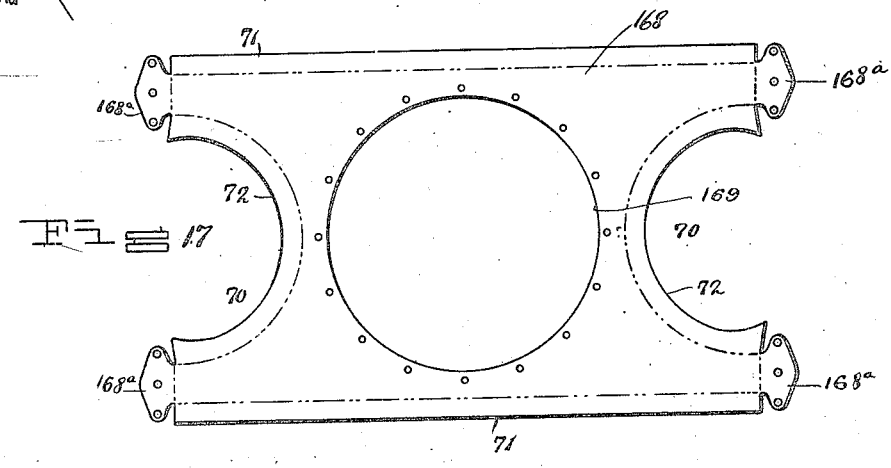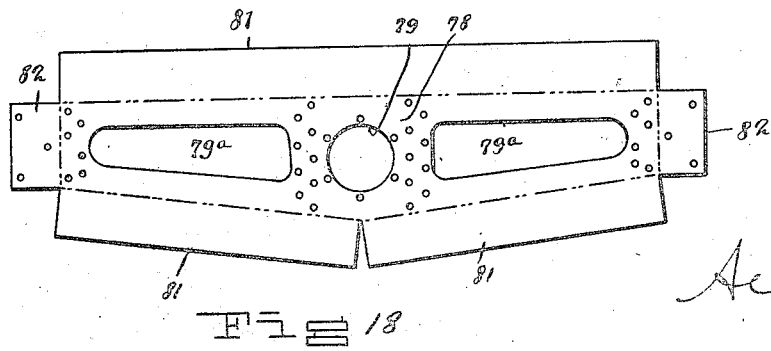

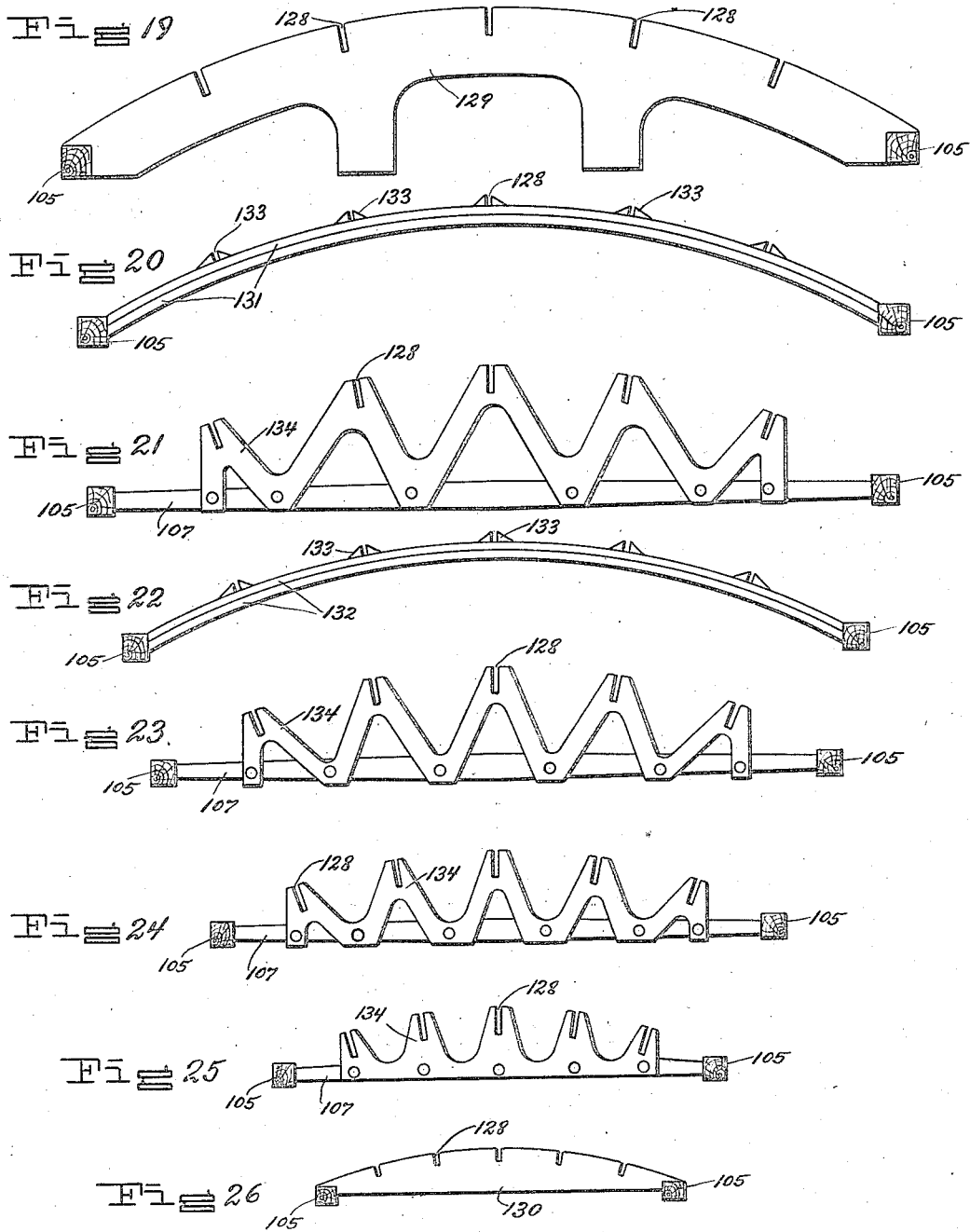

ALLIOTT VERDON ROE, OF HAMBLE, SOUTHAMPTON, ENGLAND.

AEROPLANE-FUSELAGE.

1,323,103.  Specification of Letters Patent.  Patented Nov. 25, 1919.

Application filed March 22, 1918. Serial No. 224,086.

*To all whom it may concern:*

Be it known that I, ALLIOTT VERDON ROE, a subject of the King of Great Britain, residing at Hamble, Southampton, England, have invented certain new and useful Improvements in Aeroplane-Fuselages, of which the following is a specification.

This invention pertains to aircraft, and directs itself to the provision of improvements in the fuselage resulting more particularly in the advantages of:

A fuselage of light, strong and absolutely dependable construction,—a fuselage so constructed and equipped as to permit the propelling engine to be mounted wholly forward to the front end of the fuselage proper and within the front cowl and yet to avoid the necessity of journaling the engine shaft at a point forward of the engine, which is preferably of the rotary type,—a fuselage which, as by the ready substitution of one engine adapter plate for another may be reconstructed, on the training field or elsewhere, to mount and support a propelling engine of any one of a great plurality of different types,—a fuselage having remarkably light yet sufficiently sturdy supports and contour-definers for the fabric covering of the fuselage aft the cowl at its forward end,—a fuselage constructed and adapted to carry, adequately and yet without undue strain, a main engine plate and an auxiliary engine plate both aft of the cowl, for mounting any one of a great many engines with such engine plates of a novel nature and of great lightness and strength,—a fuselage wherein, partially as a result of the novel engine mounting above referred to, the center of gravity of the craft is moved back very much closer to the center of pressure than heretofore thought possible, thus in turn increasing the speed, maneuvering ability and safety of the aeroplane:—and a fuselage having other features of construction coacting with the features above referred to, to form a combination for carrying out the objects above indicated.

The invention will be more clearly understood, as well as various other objects thereof, from the following description, when taken in connection with the accompanying drawings, illustrating a preferred embodiment of the invention.

In these drawings,

Figure 1 is a front elevation of the aeroplane somewhat diagrammatic;

Fig. 2 is a similar side elevation with main interplane struts removed to exhibit clearly the front end of the fuselage;

Fig. 3 is a similar top plan view, partially broken away;

Fig. 4 is a side elevation of the forward part of the fuselage, with the fabric cover removed;

Fig. 5 is a front elevation of the parts shown in Fig. 4;

Fig. 6 is a view similar to Fig. 4, showing in side elevation a longitudinal subdivision of the fuselage aft the section shown in Fig. 4;

Fig. 7 shows, on a reduced scale, a side elevation of a longitudinal subdivision of the fuselage aft the section shown in Fig. 6;

Fig. 8 is a top plan view of the parts shown in Fig. 7;

Fig. 9 is a view showing in side elevation, on the same scale as Fig. 7, a longitudinal subdivision of the fuselage aft that shown in Fig. 7;

Fig. 10 is a top plan view of the parts shown in Fig. 9;

Fig. 11 is a transverse vertical section taken on the line 11—11 of Fig. 6, looking forward;

Fig. 12 is an enlarged detailed view showing certain of the engine-mounting parts shown in Fig. 4, parts of the engine being shown in dot-and-dash lines;

Fig. 13 is a front elevation of the parts shown in Fig. 12, to one side of a vertical center line;

Fig. 14 is a perspective detail of one of the members shown in Figs. 12 and 13;

Fig. 15 is a rear elevation of another of the members shown in Figs. 12 and 13;

Fig. 16 is an axial sectional view of the member shown in Fig. 15;

Fig. 17 is a development of the blank form which one of the members shown in Figs. 12 and 13 is formed;

Fig. 18 is a development of the blank from which another of the members shown in Figs. 12 and 13 is formed;

Figs. 19—20—21—22—23—24—25 and 26 are rear elevations of elements for defining the top transverse curvature of the fabric covering for the fuselage wherein the longerons are shown in cross section, these several views showing respectively the elements indicated at 19—20—21—22—23—24—25 and 26 in Figs. 7 and 9;

Fig. 27 is an enlarged detailed view showing certain of the parts of Fig. 9;

Fig. 28 is a transverse vertical section taken on the line 28—28 of Fig. 27;

Fig. 29 is a top plan view of the parts shown to the right of Fig. 27.

Referring to Figs. 1—2—3, the fuselage is indicated at 30, the tractor airscrew at 31, the rotary engine at 32, the front skid at 33, the landing wheels at 34, the vertical rudder at 35, the fixed tail planes at 36, the elevators at 37, the upper plane at 38, the lower plane at 39 and the ailerons at 40.

The forward subdivision of the fuselage is located forward of the joint 41 Fig. 6, between the abutting ends of the upper longerons 42 of the forward subdivision of the fuselage and the similar longerons 105 of the after subdivision of the fuselage, likewise forward of the similar joint 43 between the bottom longerons 44 of the forward subdivision of the fuselage and the corresponding bottom longerons of the rear subdivision but joints 41 and 43 lie to the rear of the struts 45 one of which is shown in Fig. 6. The abutting ends of corresponding top and bottom longerons are respectively connected by means of suitable fish plates 93.

The longerons 42 and 44 of the forward subdivision of the fuselage, at their forward ends, are joined to a pair of upright struts 46 (Fig. 5) and an upper cross member 47, by means of stamped metal corner pieces 48 and 49. The lower longerons are curved upwardly near the front of the fuselage as indicated at 44' in Fig. 4. The upper corner pieces 48 are folded over two adjacent faces of the upper longerons 42 and of the struts 46, and are provided with front, side and top (not shown) brace lengths 48'. Each lower corner brace 49 as shown in Fig. 4 includes two duplicate side plates 49'—one on each side of the struts 46 and 61 and the longeron 44—united by a yoke-piece 49" across the front of strut 46. A lug 49$^a$ integral with and extending from the yoke-piece 49" is bolted to the top face of each bottom longeron at the terminal portion 44$^a$ thereof—which portion extends in front of the front struts 46. Beneath the front end of each longeron 44 is bolted a fitting 50 having a lug 50$^a$ which forms part of the attachment for the undercarriage and further lugs 50$^b$ and 50" to which are attached certain of the bracing wires which brace external members to the fuselage.

The fuel tanks are hung in a sling 54 just in rear of the construction just described.

Immediately to the rear of the tanks 53 each side of the fuselage is provided with a pair of downwardly converging inclined struts 55$^a$, 55$^b$ and a light substantially vertical strut 56; the upper ends of the strut 55 and of the strut 56 being secured to a stamped metal fitting 57 fixed to an upper longeron 42. The lower ends of the two struts 55$^b$, 55$^a$ converge toward and are secured to fitting 58 fixed to the lower longeron 44. The upper end of each forward strut 55$^a$ is secured to the stamped metal fitting 60 fixed to the upper longeron 42 and having a lug 60' to which is attached the upper end of a large, strong, upwardly and rearwardly inclined thrust-receiving strut 61 whose lower end is secured between the side plates of the corner-piece 49. These struts 61 carry between them the rear engine plate 78 and while very strong to resist thrusts in the direction of their length, are nevertheless exceedingly light, since while very wide they are of rather small thickness. Intermediate the ends of each strut 61 is attached a plate 62 carrying swiveled at its upper and lower ends pairs of turnbuckles 63 and 64. Stays 65 connect the turnbuckles 63 with a bracing lug 66 fixed to the fitting 58 on the lower longeron 44. Stays 67 connect the turnbuckles 64 with two eyeleted apertures 68 provided on the fitting 48. From each of the plates 62 a short kingpost 51 extends perpendicularly outward and is provided at its outer extremity with a transverse seating for a stay wire 52, anchored at one end to a bracing lug 60$^a$, attached to the fitting 60, and, at the other end, connected by a turnbuckle 52$^a$ to a bracing lug 49$^a$ attached to the corner-piece 49. The particular function of the stays 52 is to prevent either of the struts 61 from bowing outwardly and so displacing the rear engine plate 78 located between said struts, while stays 65 and 67 on opposite sides of the fuselage coact with the construction just described to complete the strengthening and rigidifying of the portion of the fuselage forward subdivision shown in Fig. 4, which, as will immediately appear, emplaces and sustains the rotary engine. It will be understood, or seen later, that the function of the stays 65 and 67 is to resist pulling strains between fitting 58 and corner pieces 48 at each side of the fuselage.

Referring to Figs. 4—5—12—13—14—15—16 and 17, there extends across the fuselage a main engine plate 168, bolted or otherwise secured by its lugs 168$^a$ to the two struts 46, which latter are reinforced by outer metal plates 69. The design of this engine plate is very important, since it has been found to possess great strength and lightness, being preferably formed of sheet metal stamped and pressed into shape to provide a large central opening 169 (Fig 12), semi-circular cut out portions 70 (Fig. 5), bent over edge portions 71 at top and bottom and similarly bent over edge portions 72 surrounding the curved boundaries of the semi-circular cut out portions 70. This engine plate is further anchored in position and the front portion of the fuselage forward subdivision is further braced and strengthened by four converging substantially similar stays 73. This engine plate is so arranged that its opening 169 is large enough to have passed therethrough a portion 74 (Fig. 12) forming, as is well known, a standard part of a fixed crank shaft disposed at the rear of a comparatively great plurality of standard powerful rotary engines of the kind sometimes referred to as the Gnome-type. In Fig. 12 the engine shaft of such an engine is indicated at 75, prolonged a short distance in rear of the hub 74. Conjointly with the prolongation of the main engine shaft just described, the engine mounting equipment includes a plurality of adapter-rings 76 each ring having an inner circumferential series of bolt holes as indicated so arranged as to register with a series of bolt holes drilled or which may be drilled through the particular kind and size of flange 77 forming a part of the characteristic design of the particular one of the engines desired to be installed. Each adapter-ring also carries a concentric outer circumferential series of bolt holes as indicated, and in all adapted-rings these outer series of bolt hole are identical, adapted to register with a similar series of bolt holes provided in the main engine plate 168 surrounding the opening 169.

The rear or auxiliary engine plate is in the form of a horizontal, transverse, stamped and pressed metal girder 78, which, while elongated laterally of the fuselage, has features in common with the main engine plate 168 in that the girder has a central circular opening 79 for having bolted thereon an adapter-ring 80, cut away portions or lightening holes 79ª on either side of the said central opening and, at its top and bottom, bent over edge portions 81. The side edge portions 82 of the girder are also bent over as shown in Fig. 5, and by means of these bent over end portions the girder is attached to and mounted in place between the large struts 61 opposite the plates 62 so that it directly opposes the end thrusts along the kingposts 51 due to the stay wires 52 above described. By these means the rear engine plate is prevented from endwise movement, such as would tend to throw its central opening out of alinement with the central opening of the front engine plate 168. The girder is further braced and rigidified by a pair of hollow metal pillars 83, formed and stamped from sheet metal as shown most clearly in Fig. 14, and bolted to the girder as shown on Fig. 13.

The adapter-ring 80 is internally threaded, as shown in Fig. 12, for the adjustment therein of a clamping ring 84 for anchoring the shaft 75 of the particular rotary engine installed.

It has been found in practice that by the above construction, any one of at least eight of the rotary engines commonly used by the Allies in the present war for training, fighting, bombing and other aeroplanes, may be easily substituted for another without in any way altering the construction of the fuselage or of the aeroplane: The engine mounting may, however, be further stiffened by the insertion of a pair of adjustable tierods (not shown) located one on either side of the engine shaft 75 and staying the main engine plate 168 to the rear engine plate 78.

The construction of the front engine plate 168 will perhaps be more clearly understood from an examination of Fig. 17 and the construction of the main part of the rear engine plate 78 from an examination of Fig. 18.

The lower front portion of the fuselage forward subdivision is further strengthened laterally by means of a lower cross member 90—preferably a tube, attached at its ends to the inner side plates of the front bottom corner pieces 49.

The cowl forming part of the present invention is merely a light shell preferably of metal surrounding the top, sides and a part of the front of the engine compartment 85. This shell may be formed by four pressed metal sections 86 having beaded and overlapping side edges 87 and secured at their rear edges to three lightened contour-definers consisting of sheet like members 88 fixed on the struts 46 and cross bar 47 and having curved ash rims or strips 88'. The metal shell sections are secured at their front edges to a circular metal angle piece 89. The cowl is further strengthened by a link 91 (Fig. 5) secured at opposite ends to the lower confronting ends of the angle piece 89 or to lugs 92 projecting from said ends. Sheet metal panels 86' (Fig. 2) extend along the sides of the body in continuation of the side sections 86 of the cowl and these panels are attached at their front edges to the contour definers 88 and at their rear edges to similar contour definers affixed to and projecting outwardly from the side struts 55ª.

Referring again to Figs. 4 and 6 and also to Fig. 11, to complete the description of the fuselage forward subdivision, the rearmost side struts of this subdivision are indicated at 45 in Fig. 6 and it will be understood that the side bays of the subdivision to the rear of struts 56—i. e. the bays in which longeron joints 41 and 43 are located—are cross-braced with wire stays 59. All the bays along the bottom of the forward subdivision are similarly cross-braced but the top of the fuselage in this region is braced by means of a built up wooden stiffener 42ª extending from the rear of the tanks 53 in the forward subdivision to the foremost struts 109 of the rear subdivision and having suitable openings or cutaway portions for the cockpits. Extending laterally of the fuselage at strut 45 is a cross bearer 94, secured at its opposite ends to struts 45 and having bolted thereon two floor brackets 95 for supporting floor structure members 96. Further cross bearers for the floor structure are attached to the side struts 56, 55ᵇ and 61 but since these cross bearers do not constitute a part of my present invention they have been omitted from the drawings in order to avoid unnecessary complication. For strengthening purposes, longitudinal depending webs 97, widening between the struts 45, form a part of the floor structure members 96, which are very securely fastened in position. Adjacent to their rear ends the webs 97 have secured thereto the upper end of a forwardly downwardly inclining, preferably tubular metal stay rod 101 which is connected securely to the lower longerons 44, fittings 43ª, or lower cross piece (not shown) opposite the fittings 43ª. In the same way, the lower end of a stay 102 is anchored at each side of the fuselage, the upper end of this stay being secured to a fitting 103 secured in place at the rear extremity of the floor structure as shown, this fitting also having attached thereto the lower end of a stay 104 running upwardly and rearwardly for taut connection to an upper longeron of the fuselage rear subdivision at a point well in rear of the joint 41. As aforesaid the forward subdivision may be completely constructed and substantially completely equipped, before it is connected up to the rear subdivision of the fuselage, but in such case the stay 104 is either not yet in place or is unattached at its upper end, after the rear subdivision of the fuselage has been bolted up to the forward subdivision by means of the fish plates 93.

The instrument board 98 is secured in place as is shown, the lower edge of the board being received in a fitting 99, held in place by upwardly diverging stays 100.

Referring now to Figs. 6 to 10, the upper longerons 105 and the lower longerons 106 are shown extended back to a vertical rudder sleeve 106′, secured against the rear face of the sternpost strut 106ª, the convergence of the two upper longerons at the rear of the fuselage (Figs. 8 and 10) being sharper than the convergence of the upper and lower longerons at each side of the fuselage. The upper and lower pairs of longerons are braced at intervals by cross pieces 107 with crossed stays 108 in between.

Opposite each of these cross pieces, with the exception of the next to the right one in Fig. 10 there are arranged, between the two longerons at each side of the fuselage, upright struts 109 of the well known design. Between each two adjacent struts 109, 106ª and 114 shown in Figs. 7 and 9 are provided crossed stays 110. Finally this rear subdivision of the fuselage has transverse internal cross bracing at each pair of struts 109 and 114.

In order to prevent the curved longerons in the rear subdivision of the fuselage from buckling they are reinforced in their curved regions by light stiffeners 113 of plywood or other thin strong material. These stiffeners 113 are applied to the top and bottom longerons of the fuselage for every side bay from struts 45 to the struts 109 shown at the extreme right hand side of Fig. 7. Corresponding bottom bays of the fuselage have similar stiffeners 113′ attached to the bottom longerons. The free edges of the stiffeners 113 and 113′ preferably have the arcuate shape indicated in the drawings, whereby they may possess a minimum weight in combination with a maximum amount of resistance to bending of the longeron. This construction, it has been found, gives the fuselage rear subdivision great strength and lightness, and makes it able to stand up under bad strains.

In order to stiffen the tail portion of the fuselage and make provision for the attachment of the tail planes the following construction has been found ideal, see Figs. 9—27—28 and 29. Between the two struts 109 to the right of Fig. 9 there is provided at each side of the fuselage a strut 114, the lower ends of which struts are secured to the lower longerons and the upper ends of which are received in sockets 115 welded on a tubular metal cross piece 116 whose function is to form a socket on either side of the machine for the front spars of the tail planes (not shown). This socket tube has, at either end, tangential flange plates 117 by which it is attached to packing blocks 118 secured to the top longerons 105. These packing blocks 118 are tied together within the fuselage by a thin sheet like stiffener 119 of ply wood or the like which has an arched lower edge and is attached near its upper edge to one of the wooden cross pieces 107. External stiffeners 120 are secured to the outer faces of the packing blocks 118 and the outer sides of the upper longerons 105. Over the tail end of the fuselage, from a position 26—slightly in front of the side struts 114 extends a light wooden decking 121 of convex shape as shown in Fig. 9. Between a transverse line 26 on Fig. 9 and another transverse line 19 on Fig. 7, (i. e., a line somewhat behind the rear cockpit) the top decking consists of a fabric covering suitably stretched over a framework of transverse formers and longitudinal contour definers, hereinafter described.

Referring to Figs. 4—6—7—9 and 11, the contour-definers for the opposite side portions of the fuselage may be mounted in place when the two sections of the fuselage are joined; these definers comprise a plurality of wooden or other suitable strips 122, set at their forward ends in nests 123 carried by the forward convex formers attached to the struts 55 and to brackets 123' protruding from the struts 56 whence they are threaded back toward the struts 114 and the struts 45, respectively, through U-hangers 124 shown most clearly in Fig. 11. Two similar strips 112' extend along the bottom of the fuselage from nests upon the bottom cross piece corresponding to struts 45 to another bottom cross piece, slightly in front of the struts 114. Forward of these strips, the bottom of the fuselage is cased in with a sheet metal undershield which may be in several separate panels and may also be extended over the front edge of the fuselage, immediately behind the cowl, whereby it completely protects the occupant of the front cockpit from oil or exhaust products discharged from the engine. Beneath the two extreme tail end bays of the fuselage and extending from the rear ends of the strips 112' to the rudder sleeve 106' is affixed a light bottom decking corresponding to the top decking 121 aforementioned but presenting a flat instead of a convex exterior.

In Fig. 11 the lines 125 indicate the disposition assumed by the covering fabric 125 of the fuselage.

Referring now to the contour definers for the top of the fuselage, those indicated at 126 in Figs. 4 and 6 are of a smooth curved contour adapted to carry a light decking 126'. But from a point aft of the left hand end of Fig. 7, however,—now referring to Figs. 7 and 9,—contour-definers of different construction are employed. These definers comprise a plurality of rearwardly converging strips 127 each laid in a longitudinal series of alined slots 128 cut in the tops of the deck formers shown in Figs. 19 to 26, which correspond respectively to the constructions used at the points 19 to 26 of Figs. 7 and 9. In each of Figs. 19 to 26 the longerons are shown at 105. In Figs. 19 and 26 these formers comprise thin flat members 129 and 130, having arcuate top edges with slots 128 cut therein. At the point 26 in Fig. 9 no cross piece 107 is present, and this is true also of the points 20 and 22 where the construction, as shown in Figs. 20 and 22, comprises two curved ash strips 131 and 132 having secured thereupon small triangular pieces 133 arranged in pairs with the two elements of each pair spaced to provide one of the slots 128. The remaining formers, those of Figs. 21, 23, 24 and 25, consist merely of zig-zag or deeply notched strips 134 carrying the slots 128 as shown and each secured to the cross piece 107 found at its location.

Although I have herein shown and described one form of aeroplane embodying my invention, it is to be understood that the various changes and modifications may be made without departing from the spirit thereof and that the scope of the invention is indicated by the claims hereunto appended.

Certain features shown on the drawings or herein referred to are fully described and claimed in my copending application, Serial Number 224085 filed 22nd March 1918.

I claim:

1. A fuselage construction comprising a fuselage constructed of two longitudinal subdivisions, including longerons and a bracing construction for the forward subdivision and longerons and a bracing construction for the after subdivision, and wherein one of the subdivisions carries a floor structure projecting beyond said subdivision, and means for anchoring said floor structure to the other subdivision.

2. A fuselage as described in claim 1, wherein the anchoring means for the floor structure comprises bracing members above the floor structure, which are inclined.

3. A fuselage as described in claim 2, wherein said anchoring means comprises bracing members above the floor structure, which are inclined and alined.

4. A fuselage as described in claim 2, wherein said anchoring means comprises bracing members above the floor structure, which are inclined and alined and constituted as flexible stays to be drawn taut and anchored adjacent to the upper and lower longerons.

5. A fuselage as described in claim 1, wherein the forward subdivision carries a floor structure projecting in rear of said subdivision, and means for anchoring said floor structure to the after subdivision.

6. A fuselage as described in claim 5, wherein said anchoring means comprises inclined bracing members one above and one below the floor structure and substantially alined.

7. A fuselage as described in claim 1, wherein the longerons of the after subdivision are reinforced in their curved regions by auxiliary sheet-like members attached along their length for the purpose of stiffening the same.

8. A fuselage as described in claim 7, wherein certain of said auxiliary sheet like members are mounted on the longerons between pairs of adjacent struts.

9. A fuselage as described in claim 7, wherein the auxiliary members are sheet like elements each having one of its edges conformed to the outer curvature of the longeron and its opposite edge of arcuate form for the purpose specified.

10. A fuselage as described in claim 1, wherein the after subdivision is provided with a tubular cross piece supported upon packing blocks dependent from the upper longerons.

11. A fuselage according to claim 10, wherein the said dependent packing blocks are tied together within the fuselage by a transverse sheet like stiffener having an upwardly arched lower edge.

12. A fuselage according to claim 11, wherein the transverse structure therein described is auxiliary to a cross piece of usual form and size interposed between and attached to the upper longerons.

13. A fuselage as described in claim 10, and having on either side of its after subdivision a sheet like stiffening member one face of which is applied to the outer face of the upper longeron and to the corresponding outer face of the packing block dependent from the said longeron.

14. A fuselage as described in claim 10, wherein the tubular metal cross piece is provided with dependent metal sockets which receive the upper ends of the side struts in either side of the said fuselage.

15. A fuselage construction for the forward ends of a fuselage, comprising four longerons, an upper cross-piece, side struts, sheet formers of curved arcuate shape offset exteriorly from the fuselage near the cross-piece and the struts, arcuate wooden strips overlying the said formers, and light shell sections secured at their rear ends to said strips and having meeting side edges to form a cowl.

16. A fuselage construction as described in claim 15, wherein said meeting edges of the shell sections are beaded and overlap and nest one with another.

17. A fuselage construction as described in claim 15, wherein the front edges of the sections are secured to a common substantially arcuate member of angular cross-section.

18. A fuselage construction as described in claim 15, wherein a lateral tie-link is secured at its opposite ends to the lower forward edges of the two side sections of the cowl.

19. A fuselage construction for the forward end of a fuselage, comprising the four longerons, vertical struts adjacent to their forward ends joining the upper and lower longerons at each side, a plurality of rear struts inclined toward each other disposed at each side, and an upwardly rearwardly inclined extra heavy strut of considerable width compared to its breadth at each side forward of said inclined rear struts and rising from near the bottom of the first mentioned struts, and connected at its ends to the upper end lower longerons, the struts inclined toward each other being joined to the upper longerons closely adjacent to the anchorage of the upper ends of the heavy struts.

20. A fuselage as described in claim 19, wherein certain of the struts are provided with outwardly extending posts intermediate their ends and stays join the outer end of said posts and the upper and lower ends of the struts.

21. A fuselage construction as described in claim 19, wherein each heavy strut in side elevation is formed at one edge of two substantially straight converging portions and at its other edges of a central substantially straight portion and two shorter substantially straight portions each converging toward one of the portions of the first edge.

22. A fuselage construction as described in claim 19, wherein light metal corner pieces are secured to the lower ends of the first mentioned struts and of the two heavy struts and to the forward ends of the lower longerons.

23. A fuselage construction as described in claim 22, wherein each corner piece has a substantially diamond shaped leaf lying against the lower portion of the adjacent heavy strut.

24. A fuselage construction as described in claim 22, wherein the said metal corner pieces securing the bottom ends of the front struts to the longerons are tied together by a tubular metal cross piece.

25. A fuselage construction as described in claim 19, wherein at each side of the fuselage taut stays are stretched from fittings upon the forward ends of the upper longerons in front of the heavy struts and from fittings upon the lower longerons to the rear of the feet of the heavy struts and the said taut stays are connected by suitable means to points near the middles of the heavy struts.

26. A fuselage construction as described in claim 25, wherein two stay-lengths are provided above and below each heavy strut.

27. A fuselage construction as described in claim 26, wherein the stay lengths below the heavy struts converge downwardly and rearwardly to join at their anchorage to the lower longerons.

28. A fuselage construction as described in claim 19, wherein the rear struts at each side are inclined toward each other and their lower ends secured to the lower longerons.

29. A fuselage construction as described in claim 28, wherein a pair of upright struts are provided in rear of said rear inclined struts and the rear most struts of the inclined struts are jointed at their upper ends to the upper longerons very close to the upper ends of said upright struts.

30. A fuselage construction as described in claim 22, wherein the foremost of said rear inclined struts are joined to the upper longerons closely adjacent to the anchorage of the upper ends of said heavy struts, there being provided light metal fittings for the mountings last mentioned, and such fittings and said corner-pieces being provided with leaves lying against the top and bottom outer sides of the heavy struts on each side of the fuselage with alined anchorage plates for the ends of a flexible stay adapted to reinforce the adjacent heavy strut.

31. A fuselage construction comprising, in combination with the forward cowl containing the engine, a front engine plate in rear of the engine compartment within the cowl, and a rear engine plate spaced back from the front engine plate.

32. A fuselage construction as described in claim 31, wherein the front engine plate is of sheet metal form with bent over edges and cutaway portions surrounded by bent over edges.

33. A fuselage construction as described in claim 31, wherein the front engine plate has a central opening for accommodating a standard part of an engine and is bolted to two struts of the fuselage and rigidified by a plurality of brackets converging toward the center of the engine plate and the axis of rotation of the engine.

34. A fuselage construction as described in claim 31, wherein the front engine plate has a central opening for accommodating the engine shaft of such size as to permit the passage therethrough of a standard part of the largest of several suitable engines, and an adapter ring carrying two circumferential series of bolt holes, the inner series for bolting the ring to said part of the engine and the other series for bolting the ring to the front engine plate.

35. A fuselage construction as described in claim 31, wherein the rear engine plate is mounted between the pair of heavy struts, has its opposite ends attached at or near the middle region of said heavy struts and is restrained against endwise movement by means of bracing structures applied to the outer faces of said heavy struts in such a manner as to exert end pressure upon both ends of said rear engine plate.

36. A fuselage construction as described in claim 31, wherein the rear engine plate is formed of sheet metal with bent over edges and cutaway portions surrounded by bent over edges.

37. A fuselage construction as described in claim 36, wherein the rear engine plate has a central opening for accommodating a standard part of an engine of such a size as to permit the passage therethrough of said part of the largest of several suitable engines, and an adapter ring for the particular type of engine shaft adapted to be bolted to the rear plate.

38. A fuselage construction as described in claim 37, wherein the adapter ring is internally threaded, and there is provided an externally threaded clamping ring for fixing the engine shaft of the particular engine installed.

39. A fuselage construction as described in claim 36, wherein the rear engine plate has a central opening for the passage therethrough of an engine shaft, and an upright hollow sheet metal pillar at opposite sides of the central opening bolted to the rear engine plate in several planes.

40. A fuselage construction as described in claim 1, wherein contour-definers for the sides of the fuselage are provided as elongated light strips secured at intervals to the side struts along the sides of the fuselage, and wherein near the front of the fuselage upwardly forwardly inclined struts are provided, and the forward ends of said definers are set in nests carried by formers protruding from struts and U-shaped metal straps are provided for securing the definers to other side struts.

41. A fuselage construction as described in claim 1, wherein contour definers for the bottom of the fuselage are provided as elongated light strips secured to at intervals to the cross pieces along the bottom of the fuselage and the forward ends of said definers are set in nests carried by a forward cross piece adjacent an undershield, while U-shaped metal straps are provided for securing the definers to other cross pieces.

42. A fuselage construction as described in claim 1, wherein a plurality of formers with arcuate top edges mounted on the upper longerons at intervals along the length of the fuselage, are provided with lateral spaced longitudinally alined slots, and contour-defining strips are provided to lie in said slots.

43. A fuselage construction as described in claim 42, wherein certain of said formers lie adjacent cross-pieces between the upper longerons and certain of said formers overlie spaces between said cross-pieces.

44. A fuselage construction as described in claim 43, wherein certain of said formers adjacent said cross-pieces are formed of zig-zag sheet-like members secured to their adjacent cross-pieces.

45. A fuselage construction as described in claim 43, wherein certain of the formers positioned between cross-pieces are formed of laminated wood strips carrying wood bosses establishing said slots.

46. A fuselage construction as described in claims 41 and 42 wherein the tail end of the rear subdivision of the fuselage is covered on top and underneath by light wooden deckings which extend respectively from the vertical rudder sleeve to the rear extremities of the top and bottom contour defining strips.

In testimony whereof I affix my signature.

ALLIOTT VERDON ROE.

Witnesses:
   HAWEY J. BAVERSTOCK,
   CHARLES PACK.